(12) United States Patent
Peter

(10) Patent No.: US 6,676,056 B2
(45) Date of Patent: Jan. 13, 2004

(54) SEAT BELT RETRACTOR

(75) Inventor: Cornelius Peter, Bühl (DE)

(73) Assignee: TRW Automotive Electronics & Components GmbH & Co. KG, Radolfzell (DE)

(*) Notice: Subject to any disclaimer, the term of this patent is extended or adjusted under 35 U.S.C. 154(b) by 0 days.

(21) Appl. No.: 10/085,271

(22) Filed: Feb. 27, 2002

(65) Prior Publication Data
US 2002/0125360 A1 Sep. 12, 2002

(30) Foreign Application Priority Data
Mar. 8, 2001 (DE) .......................... 101 11 323

(51) Int. Cl.[7] .......................... B60R 22/44; B60R 22/46
(52) U.S. Cl. .................. 242/374; 242/375.1; 242/390.8
(58) Field of Search .................. 242/374, 390.8–390.9, 242/375.1; 208/807

(56) References Cited

U.S. PATENT DOCUMENTS

| | | | | | |
|---|---|---|---|---|---|
| 4,002,219 A | * | 1/1977 | Steinmann | .................. | 297/475 |
| 4,478,433 A | * | 10/1984 | Taguchi et al. | ............. | 280/807 |
| 4,546,933 A | * | 10/1985 | Kanada et al. | ........... | 242/375.3 |
| 4,570,872 A | * | 2/1986 | Tsujimura et al. | ....... | 242/390.8 |
| 4,741,556 A | * | 5/1988 | Nagashima | .................. | 280/807 |
| 4,907,757 A | * | 3/1990 | Rumpf et al. | ............. | 242/385.4 |
| 5,244,231 A | * | 9/1993 | Bauer et al. | ................. | 280/807 |
| 5,558,370 A | * | 9/1996 | Behr | .......................... | 280/806 |
| 6,343,759 B1 | * | 2/2002 | Specht | .................... | 242/375.1 |
| 6,371,397 B1 | * | 4/2002 | Specht | .................... | 242/375.1 |
| 6,427,935 B1 | * | 8/2002 | Fujii et al. | ................ | 242/390.9 |
| 6,447,012 B2 | * | 9/2002 | Peter et al. | .................. | 280/806 |

* cited by examiner

Primary Examiner—Kathy Matecki
Assistant Examiner—Sang Kim
(74) Attorney, Agent, or Firm—Tarolli, Sundheim, Covell & Tummino L.L.P.

(57) ABSTRACT

A seat belt retractor has a retractor frame, a belt spool rotatably mounted in the frame, an electric drive motor, a reduction belt gear with a toothed belt connecting the electric motor permanently with the belt spool, and a winding spring functionally arranged between the frame and the belt spool, permanently biasing the belt spool with a winding moment. The electric motor is controlled to either counteract or assist the winding spring.

9 Claims, 3 Drawing Sheets

SEAT BELT RETRACTOR

FIELD OF THE INVENTION

The present invention relates to a seat belt retractor comprising a retractor frame, a belt spool rotatably mounted in the frame, an electric drive motor and a reduction gear coupling the electric motor to the belt spool.

BACKGROUND OF THE INVENTION

Conventional seat belt retractors have a winding spring permanently engaged between the frame and the belt spool to bias the belt spool in the winding direction. The winding spring must be dimensioned to overcome frictional resistance from various sources such as deflection rings and passengers cloths over which the belt webbing slides, thus ensuring the belt being substantially free of slack. On the other hand, belt tension is detrimental to comfort and, in fact, is one of the reasons for not fastening a seat belt. Sophisticated mechanisms have been developed to reduce belt tension over a limited range of belt length withdrawn from the spool to enhance comfort.

Another approach is to replace the winding spring with an electric drive motor. The electric drive motor can be easily controlled to develop appropriate belt tension in all circumstances, including pre-crash tensioning of the seat belt. In the event of an electric power failure, however, no winding function is available, and the seat belts cannot be used, nor can they be stowed away by winding on their belt spools.

SUMMARY OF THE INVENTION

The present invention provides a seat belt retractor with an electric drive motor wherein a winding function is available even in case of an electric power failure. According to the invention, the belt retractor comprises a retractor frame, a belt spool rotatably mounted in the frame, an electric drive motor and a reduction belt gear with a toothed belt connecting the electric motor permanently with the belt spool. A winding spring is functionally arranged between the frame and the belt spool, permanently biasing the belt spool with a winding moment. The electric motor is controlled to either counteract or assist the winding spring. In case of an electric power failure, the winding spring must drive the belt spool and simultaneously entrain the electric motor through the reduction gear that now acts as a step-up gear. As a first requirement, the reduction gear must be reversible, i.e. it must transmit rotation in both directions. A second requirement is that the reduction gear should have a high efficiency thereby limiting the necessary spring force. A belt gear inherently satisfies both requirements.

In the preferred embodiment of the invention, a length of belt webbing withdrawn from the belt spool is detected. The length of belt webbing withdrawn is compared to predetermined threshold values to discriminate between a belt wearing condition and a belt non-wearing condition. The electric motor is driven in the wearing condition with current of a first polarity and adjusted to counteract the winding spring for appropriate belt wearing comfort, and is driven in a non-wearing condition with current of a second, opposite polarity adjusted for full retraction of belt webbing on the belt spool. Thus, belt tension can be adjusted for an optimum comfort after an initial tensioning to remove excessive belt slack, and increased in the non-wearing condition to safely retract, in combination with the winding spring, the belt webbing on the belt spool. The winding spring is dimensioned to overcome frictional resistance and mass inertia in the entire belt system, including the reduction gear and the electric motor.

BRIEF DESCRIPTION OF THE DRAWINGS

Further advantages and features will become apparent from the following description of a preferred embodiment with reference to the drawings. In the drawings.

DESCRIPTION OF THE PREFERRED EMBODIMENTS

Figure 1:
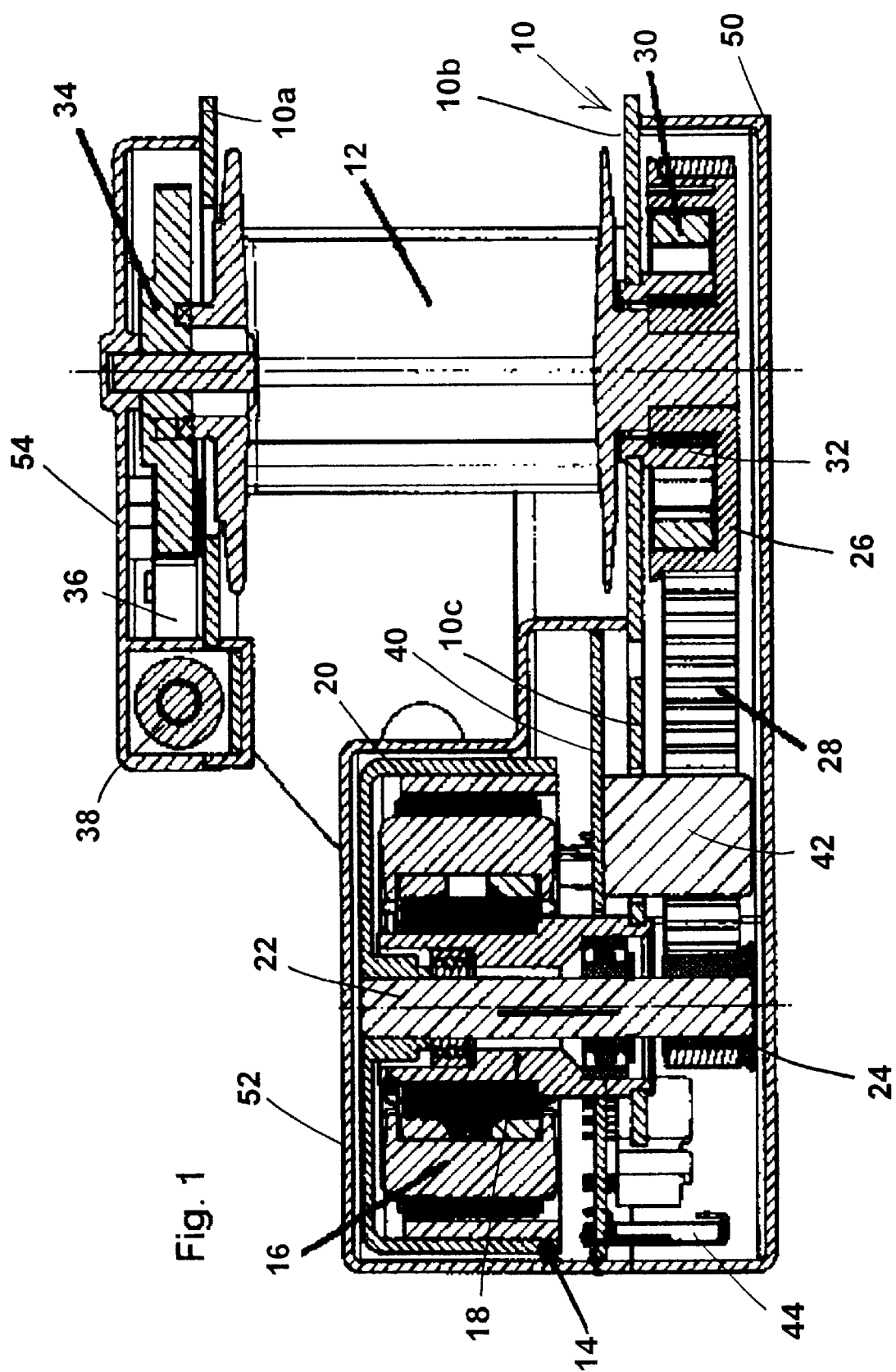
FIG. 1 is a sectional view of a seat belt retractor.

The seat belt retractor in FIG. 1 has a frame 10 with two opposed walls 10*a*, 10*b* wherebetween a belt spool 12 is rotatably mounted. Wall 10*b* of frame 10 has an extension 10*c* whereon an electric drive motor 14 is mounted. The electric motor 14 has a stator 16 carried by a bearing sleeve 18 that has an axial end fixed in an opening of wall extension 10*c*. The electric motor 14 has an external rotor 20 connected to a shaft 22 rotatably mounted in and axially extending through bearing sleeve 18. Shaft 22 has an output end projecting from the bearing sleeve 18 with a pinion 24 attached thereto for joint rotation. An externally toothed wheel 26 is attached to one axial end of belt spool 12 for joint rotation. A toothed belt 28 is trained about pinion 24 and wheel 26. Wheel 26 has an outer diameter much greater than that of pinion 24, thereby forming a reduction belt gear coupling the electric motor 14 to belt spool 12.

Wheel 26 has an annular cavity to form a spring cage for accommodation of a helical winding spring 30. Winding spring 30 has an outer end connected to wheel 26 and an inner end connected to a cylindrical bushing 32 fixed in an opening of wall 10*b* of frame 10. Bushing 32 includes a bearing for rotatably mounting spool 12 on frame 10.

On its axial side opposite wheel 26, belt spool 12 has an axial end rigidly connected to a locking wheel 34 for co-operation with a locking pawl 36 controlled by a solenoid 38.

An electric control unit is mounted on a printed circuit board 40 and includes a number of electronic components such as a capacitor 42, power FET transistors 44 and an integrated circuit incorporating a microprocessor. The printed circuit board 40 extends parallel to wall extension 10*c* and is slightly spaced therefrom.

An elongate cover 50 is fitted over wheel 26, belt 28, pinion 24 and partially over the components of the electronic control circuit and is attached to frame 10. A hood 52 is fitted over the electric motor 14 and also attached to frame 10 so as to form a continuous enclosure with cover 50 to accommodate the electric motor, the electronic control unit and the reduction belt gear. Another cover 54 is fitted over the locking mechanism formed by locking wheel 34, pawl 36 and solenoid 38.

Figure 2:
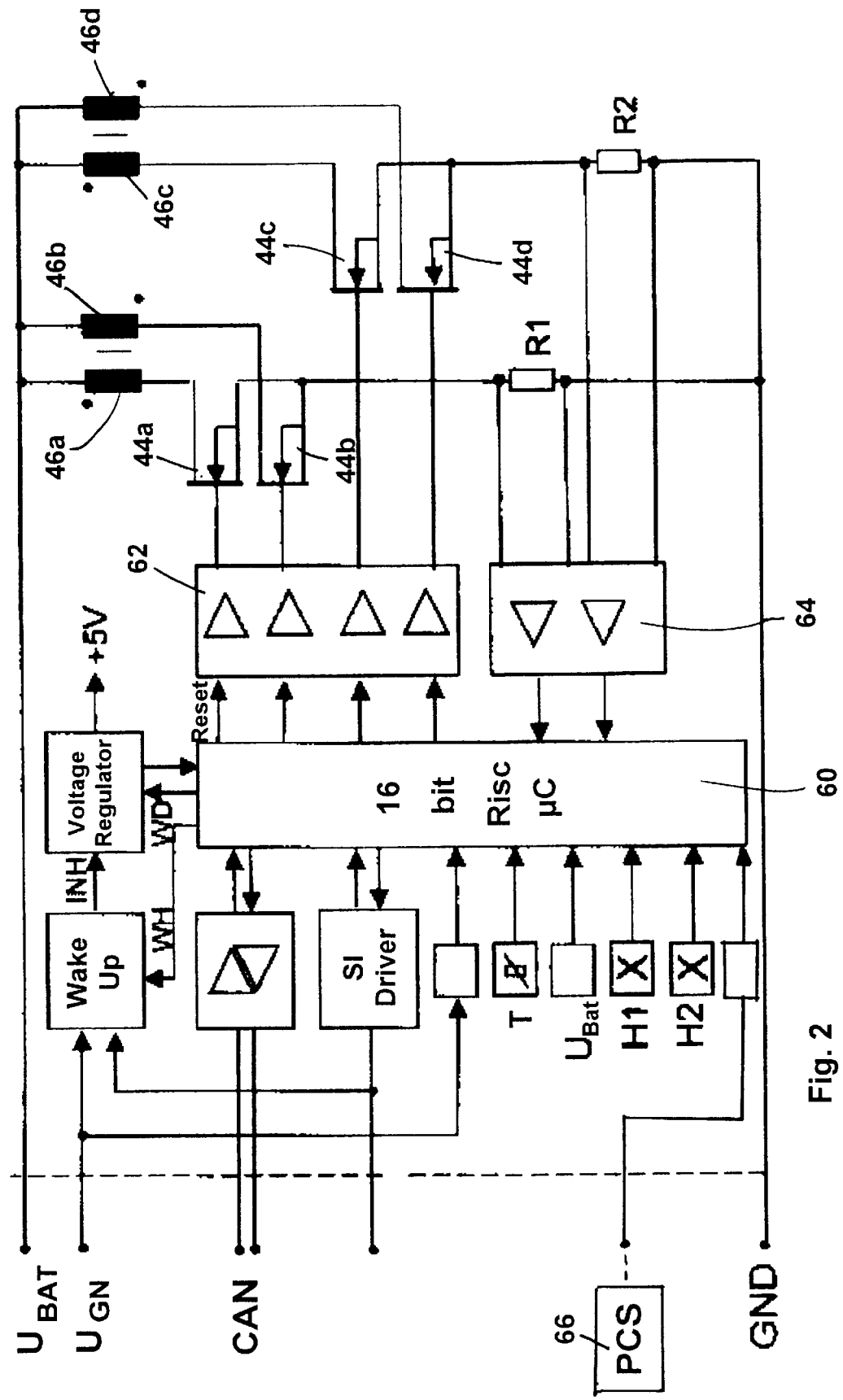
FIG. 2 is a block diagram of an electronic control circuit.

The electronic control unit shown in FIG. 2 includes a microprocessor 60 with a number of inputs and outputs. Outputs of microprocessor 60 are connected to a driver circuit 62 the outputs of which are in turn connected to control gates of power FETs 44*a*, 44*b*, 44*c* and 44*d*. Each power FET 44*a*–44*d* drives one winding 46*a*, 46*b*, 46*c* and 46*d* of stator 16. Current sense resistors R1, R2 are connected in series with the windings of stator 16. Each of the current sense resistors R1, R2 provides a voltage drop indicative of current flowing through the windings of electric motor 14 and applied to a pair of inputs of microprocessor 60 through an input driver 64. A pair of HALL detectors H1, H2 are connected to corresponding inputs of microprocessor 60. HALL detectors H1, H2 are associated with rotor 20 of electric motor 14 to detect rotational positions of rotor 20. By detecting rotational positions of rotor 20, microprocessor 60, on the one hand, controls commutation of electric motor 14 and, on the other hand, counts incremental steps of rotation so as to keep track of the absolute angle of rotation of belt spool 12 and, therefore, of webbing length withdrawn from belt spool 12. Another input of microprocessor 60 is connected to a pre-crash sensor 66 mounted in the vehicle where the seat belt retractor is installed.

Figure 3:
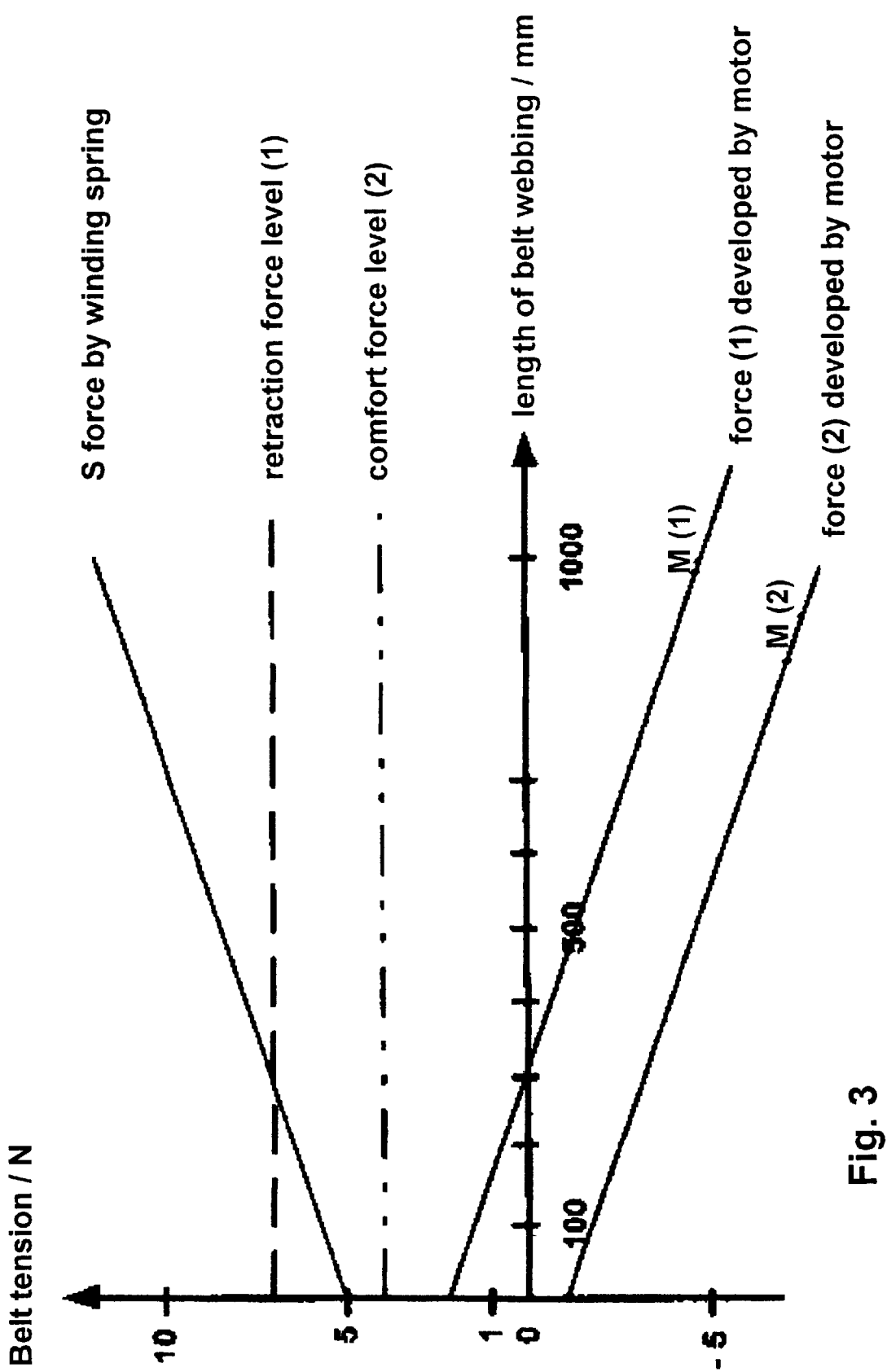
FIG. 3 is a diagram of belt forces vs. withdrawn webbing length.

Operation of the seat belt retractor will now be explained with reference to FIG. 3. In FIG. 3, line S shows the force permanently developed by winding spring 30 and appearing as a belt tension force. The belt tension force is a function of belt length withdrawn from belt spool 12. This force rises from an initial value of 5 N (fully retracted belt) to a value of above 10 N (more than 1,000 mm of belt length withdrawn). Any force developed by electric motor 14 is either added to or subtracted from the force developed by winding spring 30, depending on the sign of torque transmitted from motor 14 to belt spool 12 via the reduction belt gear. The resulting belt tension force is that experienced by the occupant wearing the seat belt, and is also that responsible for winding belt webbing on belt spool 12.

In the preferred embodiment, a first, relatively high level of belt tension is substantially constant over the length of belt webbing withdrawn from belt spool 12, as indicated by line (1) in FIG. 3. The first level (1) is used for retracting the belt webbing on spool 12. It results from the combined forces of winding spring 30 and motor 14, the force developed by motor 14 being indicated by line M(1) in FIG. 3. Force M(1) is initially on the order of 2N (fully retracted belt webbing), decreases to 0 after withdrawl of a small length of belt webbing (about 300 mm in FIG. 3) and changes sign to reach negative values compensating for the increasing forces developed by winding spring 30. A second, relatively low level of belt tension is also substantially constant over the length of belt webbing withdrawn from belt spool 12, as indicated by line (2) in FIG. 3. The second level (2) is used after the occupant has buckled the seat belt and is dimensioned for comfort. It also results from the combined forces of winding spring 30 and motor 14, the force developed by motor 14 being indicated by line M(2) in FIG. 3. Force M(2) is initially negative on the order of −1N (fully retracted belt webbing) and steadily increases to higher negative values to compensate for the increasing forces developed by winding spring 30. Switching between the first and second levels (1) and (2) is controlled by microprocessor 60 as a function of the length of belt webbing withdrawn from belt spool 12, as determined by the count of incremental rotation steps of motor 14, and comparing the current length of belt webbing with predetermined thresholds.

A third, much higher level of belt tension forces (not shown in FIG. 3) is used in a pre-crash situation as signalled by pre-crash sensor 66.

In the event of an electric power failure, the winding spring 30 still provides a winding force according to line S in FIG. 3, only somewhat reduced by frictional losses in the reduction belt gear. Winding spring 30 is dimensioned to provide a sufficient winding force under all circumstances to safely retract the belt webbing on belt spool 12.

What is claimed is:

1. A seat belt retractor comprising a retractor frame, a belt spool rotatably mounted in said frame, an electric drive motor, a reduction belt gear with a toothed belt connecting said electric motor permanently with said belt spool, said belt gear including a gear wheel connected to said belt spool for joint rotation, and a winding spring having an outer end connected to said gear wheel and an inner end connected to said frame, said winding spring permanently biasing said belt spool with a winding moment, and said electric motor being controlled in one mode to counteract said winding spring and in another mode to assist said winding spring.

2. The seat belt retractor of claim 1, wherein said winding spring is dimensioned to drive said belt spool and simultaneously entrain said electric motor through said belt gear when said electric motor is inoperative.

3. The seat belt retractor of claim 1, wherein a detector detects a length of belt webbing withdrawn from said belt spool, an electronic control unit compares the length of belt webbing withdrawn to predetermined threshold values to discriminate between a belt wearing condition and a belt non-wearing condition, and said electric motor is driven in said wearing condition with current of a first polarity and adjusted to counteract said winding spring for appropriate belt wearing comfort, and is driven in said non-wearing condition with current of a second, opposite polarity adjusted for full retraction of belt webbing on said belt spool.

4. The seat belt retractor of claim 1, wherein said electric motor is driven by an electronic control unit that has an input for a pre-crash sensor, and said electronic control unit drives said electric motor with a maximum winding moment for seat belt pre-tensioning.

5. The seat belt retractor of claim 1, wherein said gear wheel forms a spring cage and said winding spring is a helical spring accommodated in said spring cage.

6. The seat belt retractor of claim 5, wherein said helical spring has a first, outer end connected to said gear wheel and a second, inner end connected to a bearing sleeve fixed to said retractor frame, the bearing sleeve rotatably mounting said gear wheel and said belt spool, which is rigidly connected to said gear wheel, on said frame.

7. A seat belt retractor comprising a retractor frame, a belt spool rotatably mounted in said frame, an electric drive motor, a reduction belt gear with a toothed belt gear connecting said electric motor permanently with said belt spool, and a winding spring functionally arranged between said frame and said belt spool and permanently biasing said belt spool with a winding moment, said electric motor being controlled to either counteract or assist said winding spring, said electric motor being driven in a belt-wearing condition for counteracting said winding spring for appropriate belt wearing comfort, in said belt-wearing condition a belt tension force resulting from combined forces of said winding spring and of said electric motor being substantially constant on a first level over a range of belt webbing length withdrawn from said belt spool, said electric motor being driven in a belt non-wearing condition for full retraction of belt webbing on said belt spool, in said belt non-wearing condition a belt tension force resulting from combined forces of said winding spring and of said electric motor being substantially constant on a second level higher than said first level over a range of belt webbing withdrawn from said belt spool.

8. The seat belt retractor according to claim 7 wherein switching between said first and second levels is controlled by an electronic control unit as a function of the length of belt webbing withdrawn from said belt spool.

9. The seat belt retractor according to claim 7, wherein said electric motor is driven by an electric control unit that has an input for a pre-crash sensor, and a third level of belt tension force which is higher than said first and second levels is used in a pre-crash situation for seat belt pre-tensioning.

* * * * *